US010019222B2

United States Patent
Hsieh et al.

(10) Patent No.: US 10,019,222 B2
(45) Date of Patent: Jul. 10, 2018

(54) METHOD FOR OBTAINING MUSIC DATA, EARPHONE AND MUSIC PLAYER

(71) Applicant: 1MORE INC., Shenzhen (CN)

(72) Inventors: Kuanhong Hsieh, Shenzhen (CN); Boqing Lin, Shenzhen (CN); Shixuan Yu, Shenzhen (CN)

(73) Assignee: 1MORE INC., Shenzhen (CN)

( * ) Notice: Subject to any disclaimer, the term of this patent is extended or adjusted under 35 U.S.C. 154(b) by 0 days.

(21) Appl. No.: 14/763,333

(22) PCT Filed: May 15, 2015

(86) PCT No.: PCT/CN2015/079048
§ 371 (c)(1),
(2) Date: Jul. 24, 2015

(87) PCT Pub. No.: WO2016/150000
PCT Pub. Date: Sep. 29, 2016

(65) Prior Publication Data
US 2017/0046118 A1   Feb. 16, 2017

(30) Foreign Application Priority Data

Mar. 26, 2015   (CN) .......................... 2015 1 0137125

(51) Int. Cl.
*G06F 17/00*   (2006.01)
*G06F 3/16*   (2006.01)
(Continued)

(52) U.S. Cl.
CPC .............. *G06F 3/165* (2013.01); *G06F 3/167* (2013.01); *G11B 20/00086* (2013.01);
(Continued)

(58) Field of Classification Search
CPC .......... H04M 1/72558; H04M 2250/14; H04R 2201/103
See application file for complete search history.

(56) References Cited

U.S. PATENT DOCUMENTS

| | | | |
|---|---|---|---|
| 2001/0003542 A1* | 6/2001 | Kita ........................ | H04R 1/005 381/334 |
| 2002/0034302 A1* | 3/2002 | Moriai .................... | G06F 21/10 380/270 |

(Continued)

FOREIGN PATENT DOCUMENTS

| | | |
|---|---|---|
| CN | 1238092 A | 12/1999 |
| CN | 1300968 A | 6/2001 |

(Continued)

OTHER PUBLICATIONS

International Search Report and Written Opinion, dated Dec. 23, 2015, from International Application No. PCT/CN2015/079048, filed on May 15, 2015. Chinese and English translation of ISR only. Ten pages.

*Primary Examiner* — Thomas Maung
(74) *Attorney, Agent, or Firm* — HoustonHogle LLP (57) ABSTRACT

The present disclosure relates to a method for obtaining music data, an earphone and a music player. The method includes: reading an identification code from a memory card; sending the identification code to a mobile terminal so that the mobile terminal sends the identification code to a server, and the server returns stored music data, corresponding to the identification code, to the mobile terminal; receiving a music signal converted by the mobile terminal after the mobile terminal obtains the music data from the server; and outputting the music signal.

9 Claims, 8 Drawing Sheets

(51) Int. Cl.
*G11B 20/00* (2006.01)
*H04M 1/725* (2006.01)

(52) U.S. Cl.
CPC .... *H04M 1/72558* (2013.01); *H04M 2250/14* (2013.01); *H04R 2201/103* (2013.01)

(56) References Cited

U.S. PATENT DOCUMENTS

| | | | |
|---|---|---|---|
| 2003/0135748 A1* | 7/2003 | Yamada | G06F 21/10 713/193 |
| 2009/0179768 A1* | 7/2009 | Sander | H04M 1/05 340/13.27 |
| 2013/0124517 A1 | 5/2013 | Bilinski et al. | |
| 2013/0139271 A1 | 5/2013 | Arrelid et al. | |
| 2014/0045548 A1* | 2/2014 | Takei | H04W 4/00 455/556.1 |
| 2015/0078575 A1* | 3/2015 | Selig | H04R 1/1091 381/74 |

FOREIGN PATENT DOCUMENTS

| | | |
|---|---|---|
| CN | 1377567 A | 10/2002 |
| CN | 1494005 A | 5/2004 |
| CN | 1607533 A | 4/2005 |
| CN | 1614924 A | 5/2005 |
| CN | 101238494 A | 8/2008 |
| CN | 101316388 A | 12/2008 |
| CN | 101681332 A | 3/2010 |
| CN | 102082799 A | 6/2011 |
| CN | 201898594 U | 7/2011 |
| CN | 203086679 U | 7/2013 |
| CN | 103248683 A | 8/2013 |
| CN | 103297236 A | 9/2013 |
| CN | 104243183 A | 12/2014 |
| CN | 204014000 U | 12/2014 |
| CN | 204014002 U | 12/2014 |
| CN | 204231634 U | 3/2015 |
| JP | 2012152409 A | 8/2012 |

* cited by examiner

METHOD FOR OBTAINING MUSIC DATA, EARPHONE AND MUSIC PLAYER

RELATED APPLICATIONS

This Application is a § 371 National Phase Application of International Application No. PCT/CN2015/079048, filed on May 15, 2015 which claims priority to Chinese Patent Application No. 201510137125.3, titled as "Method for obtaining music data, earphone, loudspeaker, and music player", filed Mar. 26, 2015. The entire teachings of the above applications are incorporated herein by reference.

FIELD OF THE INVENTION

The present invention relates to a field of earphone application technology, and more particularly relates to a method for obtaining music data, an earphone and a music player.

BACKGROUND OF THE INVENTION

Nowadays, mobile phones are able to be connected to a network. A user can login a server by entering an ID code and a password on the mobile phone, and obtain music data from the server. In this manner, the user can enjoy a differentiated music service provided by the server. For instance, an ordinary-quality music download service can be provided to ordinary users for free, while a high-quality music download service is provided to users who pay.

However, it is a cumbersome operation and inconvenient for the user to login to the server by entering the ID code and the password on the mobile phone every time to obtain the music data. Even though it can be more convenient for the user to automatically login to the server by recording the ID code and the password, the user is still required to reenter the ID code and the password when they use another mobile phone, which leads to a bad user experience.

SUMMARY OF THE INVENTION

Accordingly, it is necessary to provide a simple and convenient method for obtaining music data, an earphone and a music player.

A method for obtaining music data includes:

reading an identification code from a memory card;

sending the identification code to a mobile terminal so that the mobile terminal sends the identification code to a server, and the server returns stored music data, corresponding to the identification code, to the mobile terminal;

receiving a music signal converted by the mobile terminal after the mobile terminal obtains the music data from the server; and outputting the music signal.

According to the above method for obtaining music data, the identification code is stored in the memory card. When a native device performing the method is connected to the mobile terminal, the identification code can be read from the memory card by the native device and be sent to the mobile terminal. The mobile terminal sends the identification code to the server, and the server returns the stored music data, corresponding to the identification code, to the mobile terminal. The mobile terminal then converts the music data into the music signal and sends the music signal to the native device, and the native device outputs the music signal. In this manner, the user only needs to carry the memory card, and insert the memory card into the native device to obtain the music data stored corresponding to the identification code by the mobile terminal, improving a convenience for the user to obtain the music data so that the user can enjoy the pleasure of music anytime and anywhere.

An earphone includes a memory card slot, a control unit, a connecting unit, and an audible unit. The memory card slot and the connecting unit are respectively connected to the control unit, and the connecting unit is connected to the audible unit; the memory card slot is configured to be inserted by a memory card; the connecting unit is configured to be connected to a mobile terminal; the control unit is configured to read an identification code from the memory card via the memory card slot; and is further configured to send the identification code to the mobile terminal via the connecting unit so that the mobile terminal sends the identification code obtained according to the microphone electrical signal to the server, and the server returns the stored music data, corresponding to the identification code, to the mobile terminal; the connecting unit is further configured to receive a music signal converted by the mobile terminal after the mobile terminal obtains music data from the server; and the audible unit is configured to output the music signal.

According to the above earphone, the identification code is stored in the memory card. When the earphone is connected to the mobile terminal, the identification code can be read from the memory card by the earphone and be sent to the mobile terminal. The mobile terminal sends the identification code to the server, and the server returns the stored music data, corresponding to the identification code, to the mobile terminal. The mobile terminal then converts the music data into the music signal and sends the music signal to the earphone, and the earphone outputs the music signal. In this manner, the user only needs to carry the memory card, and insert the memory card into the earphone to obtain the music data stored corresponding to the identification code by the mobile terminal, improving a convenience for the user to obtain the music data so that the user can enjoy the pleasure of music anytime and anywhere.

A music player includes a memory card slot, a control unit, a data transceiver unit, and an audible unit. The memory card slot, the control unit, and the audible unit are respectively connected to the control unit; the memory card slot is configured to be inserted by a memory card; the control unit is configured to read an identification code from the memory card via the memory card slot; the data transceiver unit is configured to send the identification code to a server, and receive music data returned from the server; the control unit is further configured to convert the music data returned from the server to a music signal; and the audible unit is configured to output the music signal.

According to the above music player, the identification code is stored in the memory card. When the memory card is inserted in the memory card slot of the music player, the music player can read the identification code from the memory card. The music player sends the identification code to the server, and the server returns the stored music data, corresponding to the identification code, to the music player. Then, the music player converts the music data into the music signal and outputs the music signal. In this manner, the user only needs to carry the memory card, and insert the memory card into the music player to obtain the music data stored corresponding to the identification code, improving a convenience for the user to obtain the music data so that the user can enjoy the pleasure of music anytime and anywhere.

DETAILED DESCRIPTION OF THE EMBODIMENTS

The above objects, features and advantages of the present invention will become more apparent by describing in detail embodiments thereof with reference to the accompanying drawings. It will be understood that the particular method and device embodying the invention are shown by way of illustration and not as a limitation of the invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly defined herein.

Figure 1:
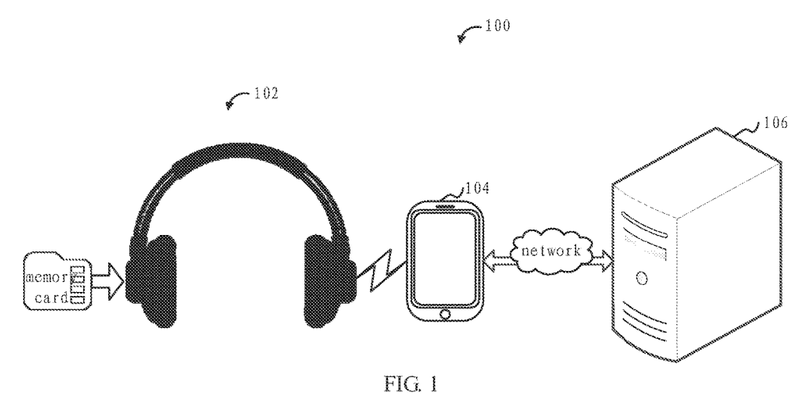
FIG. 1 is an application scene diagram of a music data processing system in accordance with an embodiment.

Referring to FIG. 1, in an embodiment, a music data processing system 100 including an earphone 102, a mobile terminal 104, and a server 106 is provided. The earphone 102 is connected to the mobile terminal 104, and the mobile terminal 104 is connected to the server 106 via a network. The earphone 102 can be, but not limited to, an ear-bud, an in-ear headphone, a heads-free earphone, or an ear-hook headphone, etc. The mobile terminal 104 can be, but not limited to, a mobile phone, a tablet computer, or a personal digital assistant, etc. The server 106 may be a physical server or a group of physical servers.

Figure 2:
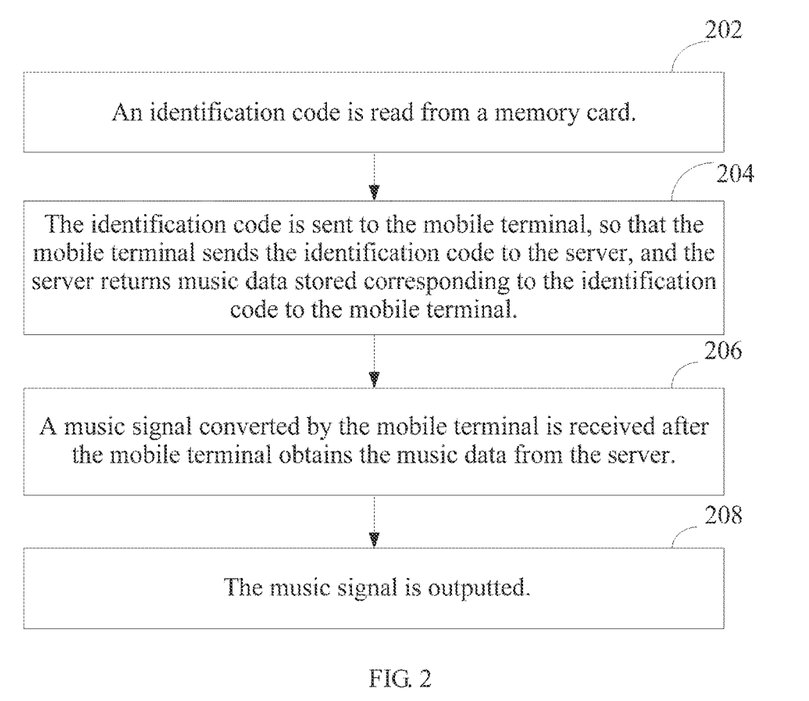
FIG. 2 is a flow chart of a method for obtaining music data in accordance with an embodiment.

Referring to FIG. 2, in an embodiment, a method for obtaining music data is provided. The illustrated embodiment illustrates the method by applying the method to the earphone 102 of the music data processing system 100. The method specifically includes the following steps:

In step 202, an identification code is read from a memory card.

The earphone 102 is provided with a memory card slot configured to be inserted by the memory card so that the earphone 102 can read data from the memory card slot. The memory card is a non-volatile storage medium. The non-volatile storage medium refers to a storage medium that prevents data stored in them from disappearing when electric current is switched off. The non-volatile storage medium includes, but not limited to, one of a magnetic storage medium, a semiconductor storage medium, and an optical storage medium, etc. The memory card can be designed into any shape according to the requirements. Preferably, the data stored in the memory card is read-only and/or encrypted.

The identification code is stored in the memory card, and the identification code is a character string unified assigned for uniquely identifying the corresponding memory card. The identification code may be automatically assigned and written in the memory card when the memory card is created, or be assigned by the server 106 and returned to the earphone 102 via the mobile terminal 104 when the earphone 102 including the memory card is connected to the server 106 via the mobile terminal 104. The earphone 102 is configured to receive the identification code and write the identification code into the memory card.

The earphone 102 can automatically read the identification code stored in the memory card when detecting the memory card inserted in it, or after the earphone 102 detects a connection is established between the earphone 102 and the mobile terminal 104.

In Step 204, the identification code is sent to the mobile terminal so that the mobile terminal sends the identification code to the server, and the server returns stored music data, corresponding to the identification code, to the mobile terminal.

After the connection is established between the earphone 102 and the mobile terminal 104, the earphone 102 sends the identification code to the mobile terminal 104. The connection between the earphone 102 and mobile terminal 104 can be a wireless connection or a contact connection. The earphone 102 may include an earphone cable and an earphone plug. The earphone 102 establishes a connection with the mobile terminal 104 via a cooperation between the earphone plug and an earphone jack of the mobile terminal 104, and the connection between the earphone 102 and mobile terminal 104 is a contact connection. The earphone 102 can also be connected to the mobile terminal 104 via a dedicated data transmission circuit to establish a contact connection.

In an embodiment, the earphone 102 may include a wireless communication module, and the mobile terminal 104 accordingly includes a wireless communication module matching the wireless communication module of the earphone 102 so that the earphone 102 can establish a wireless connection with the mobile terminal 104. The wireless communication module in the earphone 102 may be a Bluetooth module or an NFC (Near Field Communication) module.

The server 106 is provided with a user ID corresponding to the identification code. User information, user permission and available service information including music data are stored under the user ID.

Specifically, the mobile terminal may be provided with a user interface, such as an APP interface. The music data returned from the server to the mobile terminal is displayed on the user interface so that the user can choose to play any favorite music they like.

The user information may further include server identifications so that the server 106 can login other servers according to the server identifications to obtain music data from other servers and return the music data to the mobile terminal 104. For example, the server 106 can login a Tencent music server, a Baidu music server, a Kugou music server, or a Duomi music server, etc., amounting to aggregate all music data stored in other music servers by the user to the server 106, and then push the music data together to the mobile terminal 104, saving the user from logging in every music server to obtain music data. The APP user interface of the mobile terminal can further display the music data obtained from different music servers in different sections. For instance, the music data obtained from the Tencent music server is displayed in a section, while the music data obtained from the Baidu music server is displayed in another section, making it easy for the user to look up what they need and improve user experience.

In an embodiment, an application for supporting the earphone 102 to implement obtaining music data is run on the mobile terminal 104. The mobile terminal 104 receives the identification code sent from the earphone 102 via the application, sends the identification code to the server 106, and receives the music data stored corresponding to the identification code returned from the server 106.

In step 206, a music signal, converted by the mobile terminal, is received after the mobile terminal obtains the music data from the server.

Specifically, after the mobile terminal 104 is connected to the server 106, the mobile terminal 104 may automatically obtain the music data from the server 106. Alternatively, the server 106 may push music property information for obtaining the music data to the mobile terminal 104, and the mobile terminal 104 downloads the music data according to the music property information. The music property information includes, but not limited to, at least one of a name of a song, a name of an album, a singer, a librettist, and a composer, etc.

The music data may be in MP3 (Moving Picture Experts Group Audio Layer III) format, WMA (Windows Media Audio) format, or AAC (Advanced Audio Coding) format, etc.

The music information refers to a signal that the earphone 102 can output directly. Specifically, the mobile terminal 104 may decode the music data and obtain a digital signal, and then convert the digital signal to an analog music signal and output the music signal to the earphone 102.

In an embodiment, the mobile terminal 104 may also provide the user interface via an application run on the mobile terminal 104, and display the received identification code and/or the music data returned form the server 106 on the user interface. The music data can be displayed as a playlist. When the mobile terminal 104 detects a selecting operation of the music data in the playlist, the mobile terminal 104 will convert the music data to the music signal and send the music signal to the earphone 102 so that the user can choose to play any favorite music that they like, improving a convenience of operation.

In step 208, the music signal is outputted.

The earphone 102 outputs the music signal. Specifically, the music signal is converted into a sound wave and outputted. The earphone 102 can convert the music signal into a mechanical motion of a certain structure in an audible unit of the earphone 102, and the mechanical motion of the structure can drive an acoustic diaphragm to vibrate and make sounds, thereby converting the music signal into a sound wave and outputting the sound wave.

Specifically, the audible unit may be a dynamic audible unit or an armature audible unit. The dynamic audible unit refers to an audible unit with a coil and a diaphragm connected to each other in a field of a permanent magnet, the coil vibrates according to the music signal, and drives the diaphragm to make a sound. The armature audible unit is an audible unit consisting of a ferrous-metal diaphragm, a permanent magnet, and a coil of insulated wire. When the music signal is applied to the coil, the strength of the magnetic field varies, and the springy diaphragm or reed moves in response to the varying force on it.

According to the above method for obtaining music data, the identification code is stored in the memory card. When a native device performing the method is connected to the mobile terminal, the identification code can be read from the memory card and be sent to the mobile terminal. The mobile terminal sends the identification code to the server, and the server returns the music data stored corresponding to the identification code to the mobile terminal. The mobile terminal then converts the music data into the music signal and sends the music signal to the native device, and the native device outputs the music signal. In this manner, the user only needs to carry the memory card, and insert the memory card into the native device to obtain the music data stored corresponding to the identification code by the mobile terminal, improving a convenience for the user to obtain the music data so that the user can enjoy the pleasure of music anytime and anywhere.

Figure 3:
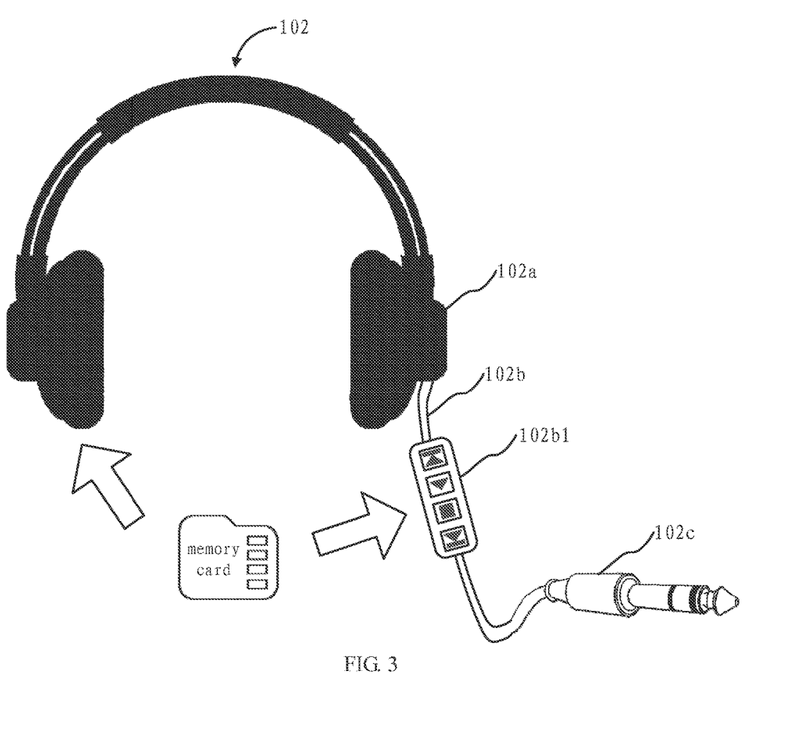
FIG. 3 is an application scene diagram of an earphone in accordance with an embodiment.

In a specific embodiment, step 202 includes: the identification code is read from the memory card inserted in the memory card slot, the memory card slot is provided on an earphone body. Referring to FIG. 3, the earphone 102 includes two earphone bodies 102a connecting with each other via an elastic component. The memory card slot may be provided on either of the two earphone bodies 102a.

In an embodiment, step 202 includes: the identification code is read from the memory card inserted in a memory card slot, the memory card slot is provided on an earphone wire control device. Specifically, referring to FIG. 3, the earphone 102 includes not only the earphone bodies 102a, but also an earphone cable 102b and an earphone plug 102c connecting with each other. The earphone cable 102b is connected to the earphone body 102a. The earphone wire control device 102b1 is provided on the earphone cable 102b. The earphone wire control device 102b1 is configured to send a playing control instruction, such as a pause/play instruction, a fast forward instruction, a backward instruction, or a multi-media switch instruction, etc., to the mobile terminal 104 connecting with the earphone 102 via the earphone cable 102b so as to control the mobile terminal 104 to perform corresponding operation according to the playing control instruction.

In an embodiment, the method for obtaining the music data further includes: a connection is established between the earphone and the mobile terminal by connecting the earphone plug to an earphone jack of the mobile terminal. Step 204 specifically includes: a microphone electrical signal is generated according to the identification code. The microphone electrical signal is transmitted to the mobile terminal 104 via a microphone circuit of the earphone cable so that the mobile terminal 104 sends the identification code, obtained according to the microphone electrical signal, to the server 106, and the server 106 returns the stored music data, corresponding to the identification code, to the mobile terminal 104.

In the illustrated embodiment, the connection between the earphone 102 and the mobile terminal 104 is a contact connection. The microphone electrical signal is generated according to the identification code read from the memory card, and specifically, the identification code read from the memory card is digital to analog converted into the microphone electrical signal. The earphone cable and the earphone plug of the earphone 102 each includes a left channel audio circuit, a right channel audio circuit, and a microphone circuit, furthermore, a ground circuit. The left channel circuit and the right channel circuit are configured to receive the music signal transmitted by the mobile terminal 104 to the earphone 102, while the microphone circuit is configured to transmit the microphone electrical signal collected by the earphone 102 to the mobile terminal 104. The microphone circuit is further configured to transmit the microphone electrical signal, generated according to any data that needed to be transmitted, to the mobile terminal 104. For example, the microphone electrical signal, generated according to the identification code, is transmitted to the mobile terminal 104 by the microphone circuit.

In an embodiment, the mobile terminal 104 can receive an equalizer regulating instruction, and adjust a sound intensity of the music signal in various frequency ranges according to the equalizer regulating instruction.

The mobile terminal 104 can further receive the equalizer regulating instruction, generate equalizer configuration information according to the equalizer regulating instruction, and upload the equalizer configuration information to the server for storing.

The mobile terminal 104 can further receive the equalizer regulating instruction, generate the equalizer configuration information according to the equalizer regulating instruction, and send the equalizer configuration information to the earphone 102. The earphone 102 receives the equalizer configuration information sent from the mobile terminal 104 and stores it in the memory card.

In an embodiment, the mobile terminal 104 can further calculate the music data corresponding to the identification code stored in the mobile terminal 104 or on the server 106, and analyze a statistical result for user preference information to obtain the equalizer configuration information adapting the user preference information. The equalizer configuration information, mentioned in the above embodiments, is used to adjust a sound intensity of the music signal in various frequency ranges.

The equalizer is a software module or a hardware module arranged in the mobile terminal, configured to adjust an amplification of the electrical signal in various frequencies, and compensate a defect in a loudspeaker and a sound field via the adjustment to the electrical signal in various frequencies. The equalizer can compensate and embellish various sound sources, and is provided with other special functions.

In an embodiment, the earphone 102 may read the equalizer configuration information stored in the memory card and transmit it to the mobile terminal 104, enabling the mobile terminal 104 to adjust the sound intensity of the music signal in various frequency ranges according to the equalizer configuration information.

In an embodiment, prior to sending the identification code and/or equalizer configuration information to the mobile terminal 104, the earphone 102 may send a pre-defined acceptance notice in a form of an audio signal so that the mobile terminal 104 starts receiving the identification code and/or the equalizer configuration information subsequently sent from the earphone 102 after detecting the acceptance notice. In the illustrated embodiment, by sending the acceptance notice before sending the identification code and/or the equalizer configuration information by the earphone 102, the mobile terminal 104 is able to identify which is a real microphone electrical signal and which is a microphone electrical signal for transmitting special information, ensuring an accurate transmission of the identification code and/or the equalizer configuration information and the real microphone electrical signal.

In an embodiment, the earphone 102 may regularly send the identification code to the mobile terminal 104 so that the mobile terminal regularly receives the identification code and starts resetting and timing every time after receiving the identification code. If the timing exceeds a preset duration, the mobile terminal 104 will stop accessing the server. In the illustrated embodiment, the timing may be at set intervals or at preset time. The preset duration may be 30 seconds to 1 minute.

In an embodiment, the memory card can further be removed from the earphone 102 and inserted in another mobile terminal, enabling the mobile terminal to read the identification code from the memory card and connect with a corresponding server. The mobile terminal obtains the music data or receives the music data pushed from the server.

In an embodiment, the method for obtaining the music data further includes: a touch operation instruction of a touch screen is received. The touch screen operates according to the touch operation instruction, and displays an operation result. Specifically, the touch operation instruction includes, but not limited to, a point touch instruction, a long press instruction, and a sliding instruction, etc. The operation according to the touch operation instruction includes, but not limited to, selected music playing, music playing control, and volume adjustment, etc.

Figure 4:
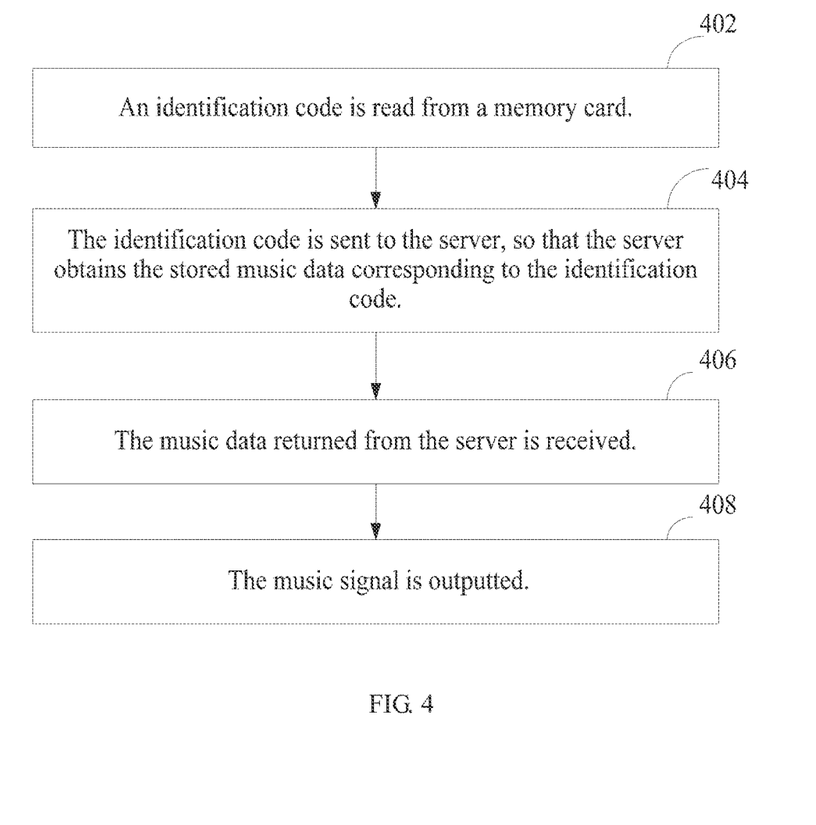
FIG. 4 is a flow chart of a method for obtaining music data in accordance with another embodiment.

Referring to FIG. 4, in another embodiment, the present disclosure provides a method for obtaining music data. The illustrated embodiment illustrates the method by applying the method to a terminal. The terminal may be a music player or a mobile terminal.

In step 402, an identification code is read from a memory card.

The terminal is provided with a memory card slot, which is configured to be inserted by a memory card. The terminal reads data from the memory card via the memory card slot. The data stored in the memory card is preferably read-only or encrypted.

The identification code is stored in the memory card, and the identification code is a character string unified assigned for uniquely identifying the corresponding memory card. The identification code may be automatically assigned and written in the memory card when the memory card is created, or be assigned by a server and returned to the terminal when the terminal is connected to the server. The terminal writes the returned identification code into the memory card.

In step 404, the identification code is sent to the server so that the server obtains the stored music data corresponding to the identification code.

The server is provided with a user ID corresponding to the identification code. User information, user permission and available service information including music data are stored under the user ID.

The user information may further correspondingly record server identifications so that the server can login other servers according to the server identifications to obtain corresponding music data from other servers and return the music data to the terminal. For example, the server can login a Tencent music server, a Baidu music server, a Kugou music server, or a Duomi music server, etc., amounting to aggregate all music data stored in other music servers, and then push the music data together to the terminal, saving the user from logging in every music server to obtain music data.

In step 406, the music data returned from the server is received.

Specifically, after the terminal is connected to the server, the terminal can obtain the music data from the server automatically or the server can push the music property information to the terminal so that the terminal can download the music data corresponding to the music property information.

In step 408, the music data is converted into a music signal, and the music signal is outputted.

Specifically, the terminal can decode the music data to obtain a digital signal, convert the digital signal into an analog signal, and output the analog signal. The terminal outputting the music signal means converting the music signal into sound waves to be outputted.

According to the above method for obtaining music data, the identification code is stored in the memory card. When a native device performing the method is connected to the server, the identification code can be read from the memory card and be sent to the server. The server returns the stored music data corresponding to the identification code to the native device. The native device then converts the music data into the music signal and outputs the music signal. In this manner, the user only needs to carry the memory card, and insert the memory card into the native device to obtain the music data stored corresponding to the identification code by the mobile terminal, improving a convenience for the user to obtain the music data so that the user can enjoy the pleasure of music anytime and anywhere.

In an embodiment, the terminal can receive an equalizer regulating instruction, and adjust a sound intensity of the music signal in various frequency ranges according to the equalizer regulating instruction. The terminal can further receive the equalizer regulating instruction, generate equalizer configuration information according to the equalizer regulating instruction, and upload the equalizer configuration information to the server for storing. The terminal can further receive the equalizer regulating instruction, generate the equalizer configuration information according to the equalizer regulating instruction, and write the equalizer configuration information in the memory card.

In an embodiment, the terminal can further calculate the music data corresponding to the identification code stored in the terminal or on the server, analyze a statistical result for user preference information so as to obtain the equalizer configuration information adapting the user preference information. The equalizer configuration information, mentioned in the above embodiments, is used to adjust a sound intensity of the music signal in various frequency ranges.

In an embodiment, the terminal may read the equalizer configuration information stored in the memory card, and adjust the sound intensity of the music signal in various frequency ranges according to the equalizer configuration information.

In an embodiment, the terminal may regularly read the identification code from the memory card, and starts resetting and timing every time after receiving the identification code. If the timing exceeds a preset duration, the mobile terminal 104 will stop accessing the server. In the illustrated embodiment, the timing may be at set intervals or at preset time. The preset duration may be 30 seconds to 1 minute.

In an embodiment, the terminal may receive a touch operation instruction of a touch screen, operate according to the touch operation instruction, and display an operation result. Specifically, the touch operation instruction includes, but not limited to, a point touch instruction, a long press instruction, and a sliding instruction, etc. The operation according to the touch operation instruction includes, but not limited to, selected music playing, music playing control, and volume adjustment, etc.

Figure 5:
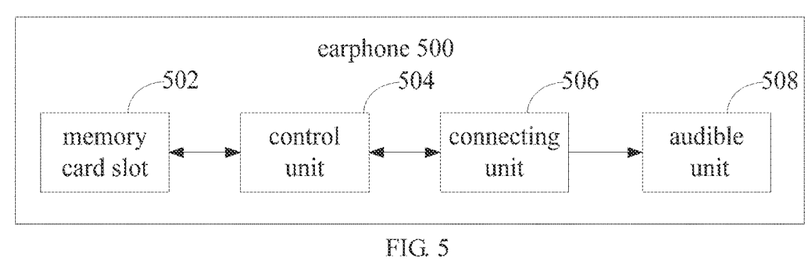
FIG. 5 is a block diagram of an earphone in accordance with an embodiment.

Referring to FIG. 5, in an embodiment, the present disclosure provides an earphone 500 including: a memory card slot 502, a control unit 504, a connecting unit 506, and an audible unit 508. The memory card slot 502 and the connecting unit 506 are respectively connected to the control unit 504, and the connecting unit 506 is connected to the audible unit 508.

The memory card slot 502 is configured to be inserted by a memory card. Specifically, the memory card slot 502 is provided with a housing adapt to the memory card for receiving the memory card. A contact of the memory card is in contact with a contact in the memory card slot 502 so that the memory card slot 502 can read data under the control of the control unit 504 and transmit the data to the control unit 504. The data stored in the memory card is preferably read-only or encrypted.

The connecting unit 506 is configured to be connected to a mobile terminal. The connecting unit 506 may be configured to establish a wireless connection or a contact connection with the mobile terminal. In an embodiment, the connecting unit 506 includes an earphone cable and an earphone plug connected to each other. The earphone cable is further connected to the control unit 504 and the audible unit 508 respectively. The earphone 500 is connected to the mobile terminal via the connection between the earphone plug of the earphone 500 and the earphone jack of the mobile terminal. The connection between the earphone 500 and the mobile terminal is a contact connection.

In an embodiment, the connecting unit 506 is a wireless communication module. Accordingly, the mobile terminal is provided with a wireless communication module corresponding to the wireless communication module of the earphone 500. The earphone 500 can establish a wireless connection with the mobile terminal via the wireless communication module thereof. If the connecting unit 506 is a wireless communication module, specifically it may be a Bluetooth module or an NFC (Near Field Communication) module.

The control unit 504 is configured to read an identification code from the memory card via the memory card slot, and is further configured to send the identification code to the mobile terminal via the connecting unit so that the mobile terminal sends the identification code to the server, and the server returns stored music data, corresponding to the identification code, to the mobile terminal.

The control unit 504 may be implemented by a single-chip microcontroller or a dedicated chip specially burnt. The identification code is stored in the memory card, and is a character string assigned for identifying the unique corresponding memory card. The identification code may be automatically assigned and written when the memory card is created, or assigned by the server when the earphone 500 with the memory card is connected to the server, and returned to the earphone 500 by the server via the mobile terminal. The control unit 504 is configured to receive the identification code and write the identification code in the memory card.

The control unit 504 can be configured to automatically read the identification code, stored in the memory card, when detecting the memory card inserted in the earphone 500 or after detecting a connection established with the mobile terminal.

The connecting unit 506 is further configured to receive a music signal converted by the mobile terminal after the mobile terminal obtains the music data from the server.

Specifically, after the mobile terminal is connected to the server, the mobile terminal obtains the music data from the server automatically. Alternatively, the server may push music property information to the mobile terminal so that the mobile terminal may download the music data according to the music property information. The mobile terminal decodes the music data to obtain a digital signal, converts the digital signal to an analog signal, and outputs the analog signal to the earphone 500.

The audible unit 508 is configured to output the music signal.

Specifically, the audible unit 508 converts the music signal to sound waves and outputs the sound waves. The audible unit 508 can convert the music signal into a mechanical motion of a certain structure in the audible unit 508, the mechanical motion of the structure can drive an audible diaphragm in the audible unit to vibrate, and output the sound waves.

Specifically, the audible unit 508 may be a dynamic audible unit or an armature audible unit.

According to the above earphone 500, the identification code is stored in the memory card. When the earphone is connected to the mobile terminal, the identification code can be read from the memory card and be sent to the mobile terminal. The mobile terminal sends the identification code to the server, and the server returns the stored music data, corresponding to the identification code, to the mobile terminal. The mobile terminal then converts the music data into the music signal and sends the music signal to the earphone, and the earphone outputs the music signal. In this manner, the user only needs to carry the memory card, and insert the memory card into the earphone to obtain the music data stored corresponding to the identification code by the mobile terminal, improving a convenience for the user to obtain the music data so that the user can enjoy the pleasure of music anytime and anywhere.

In an embodiment, the earphone 500 includes an earphone body, and the earphone body includes a housing, a memory card slot 502, a control unit 504, and an audible unit 508. The memory card slot 502, the control unit 504, and the audible unit 508 are arranged in the earphone body. The earphone 500 may include two earphone bodies, and each earphone body is provided with the housing. The memory card slot 502 and the control unit 504 may be arranged in only one of the earphone bodies.

In an embodiment, the connecting unit 506 includes an earphone cable and an earphone plug connected to each other. The earphone cable is provided with an earphone wire control device, and a memory card slot is arranged in the earphone wire control device. Specifically, except the earphone body, the earphone 500 further includes the earphone cable and the earphone plug, and the earphone cable is connected to the earphone body. The earphone cable is provided with the earphone wire control device.

In an embodiment, the connecting unit 506 includes an earphone cable and an earphone plug connected to each other, and the earphone plug is configured to be connected to an earphone jack of the mobile terminal. The control unit 504 is further configured to transmit a microphone electrical signal to the mobile terminal via the microphone circuit so that the mobile terminal sends the identification code, obtained according to the microphone electrical signal, to the server, and the server returns the stored music data, corresponding to the identification code, to the mobile terminal.

In the illustrated embodiment, the connection between the earphone and the mobile terminal is a contact connection. The identification read from the memory card is converted to the microphone electrical signal via a digital-to-analog conversion. The earphone cable and the earphone plug of the earphone each is provided with a left channel audio circuit, a right channel audio circuit, a microphone circuit, and a ground circuit. The left channel circuit and the right channel circuit are configured to receive the music signal transmitted by the mobile terminal to the earphone. The microphone circuit is configured to transmit the microphone electrical signal, collected by the earphone, to the mobile terminal, and transmit the microphone electrical signal, generated according to the data such as the identification code, to the mobile terminal.

In an embodiment, the mobile terminal 104 is configured to receive an equalizer regulating instruction, and adjust a sound intensity of the music signal in various frequency ranges according to the equalizer regulating instruction.

The mobile terminal 104 is further configured to receive the equalizer regulating instruction, generate the equalizer configuration information according to the equalizer regulating instruction, and upload the equalizer configuration information to the server for storing.

The mobile terminal 104 is further configured to receive the equalizer regulating instruction, generate the equalizer configuration information according to the equalizer regulating instruction, and send the equalizer configuration information to the earphone. The control unit 504 is configured to receive the equalizer configuration information transmitted by the connecting unit 506 and store the equalizer configuration information in the memory card.

In an embodiment, the mobile terminal is further configured to calculate the music data stored in the mobile terminal or on the server corresponding to the identification code, analyze a statistical result for the user preference information, obtain the equalizer configuration information adapting the user preference information. The equalizer configuration information, mentioned in the above embodiments, is used to adjust the sound intensity of the music signal in various frequency ranges.

In an embodiment, the control unit 504 is further configured to read the equalizer configuration information, stored in the memory card, and send it to the mobile terminal via the connecting unit 506 so that the mobile terminal adjusts the sound intensity of the music signal in various frequency ranges according to the equalizer configuration information.

In an embodiment, prior to sending the identification code and/or equalizer configuration information to the mobile terminal, the control unit 504 may send a pre-defined acceptance notice in a form of an audio signal so that the mobile terminal starts receiving the identification code and/or the equalizer configuration information subsequently sent from the earphone after detecting the acceptance notice. In the illustrated embodiment, by sending the acceptance notice before sending the identification code and/or the equalizer configuration information by the earphone, the mobile terminal is able to identify which is a real microphone electrical signal and which is a microphone electrical signal for transmitting special information, ensuring an accurate transmission of the identification code and/or the equalizer configuration information and the real microphone electrical signal.

In an embodiment, the control unit 504 may regularly send the identification code to the mobile terminal via the connecting unit 506 so that the mobile terminal starts resetting and timing after receiving the identification code. If the timing time exceeds a preset duration, the mobile terminal will stop accessing the server. In the illustrated embodiment, the timing may be at set intervals or at preset time, and the preset duration may be 30 seconds to 1 minute.

Figure 6:
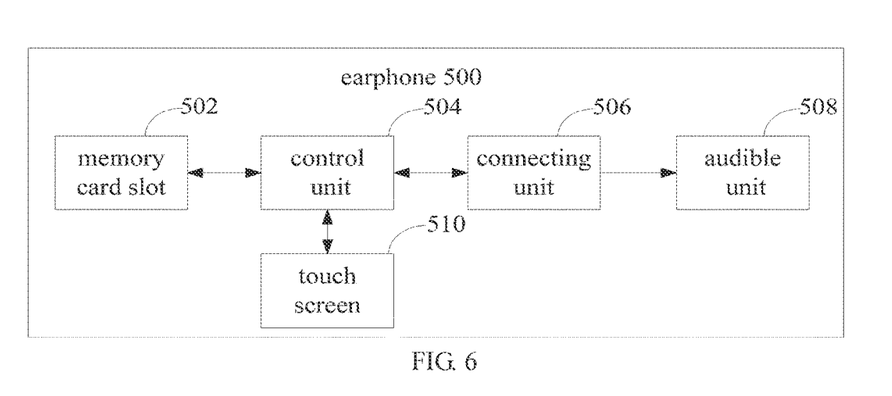
FIG. 6 is a block diagram of an earphone in accordance with another embodiment.

Referring to FIG. 6, in an embodiment, the earphone 500 further includes a touch screen 510 connected to the control unit 504. The touch screen 510 is configured to receive a touch operation instruction. The control unit 504 is configured to operate according to the touch operation instruction and obtain an operation result. The touch screen 510 is further configured to display the operation result.

Figure 7:
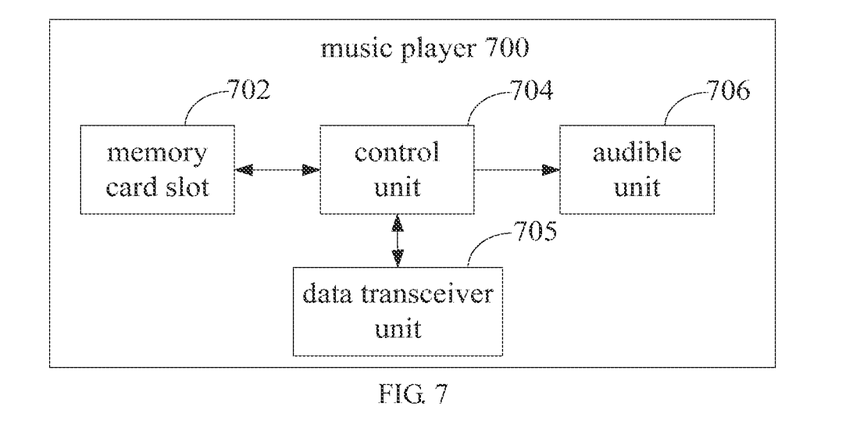
FIG. 7 is a block diagram of a music player in accordance with an embodiment.

Referring to FIG. 7, in an embodiment, the present disclosure provides a music player 700 including a memory card slot 702, a control unit 704, a data transceiver unit 705, and an audible unit 706. The memory card slot 702, the data transceiver unit 705, and the audible unit 706 are respectively connected to the control unit 704. In an embodiment, the music player 700 includes a loudspeaker.

The memory card slot 702 is configured to be inserted by a memory card. Specifically, the memory card slot 702 is provided with a housing adapt to the memory card for receiving the memory card. A contact of the memory card is in contact with a contact in the memory card slot 702 so that the memory card slot 702 can read data under the control of the control unit 704 and transmit the data to the control unit 504. The data stored in the memory card is preferably read-only or encrypted.

The data transceiver unit 705 is configured to be connected to a network, enabling the music player 700 to be connected to a server.

The control unit 704 is configured to read the identification code from the memory card via the memory card slot, send the identification code to the server via the data transceiver unit 705, and receive the music data returned by the server. The control unit 704 converts the music data to a music signal, and the audible unit 706 outputs the music signal.

The control unit 704 may be implemented by a single-chip microcontroller or a dedicated chip specially burnt. The identification code is stored in the memory card. The identification code may be automatically assigned and written when the memory card is created or assigned by the server when the music player 700 with the memory card is connected to the server, and returned to the music player 700. The music player 700 is configured to receive the identification code and write the identification code in the memory card.

The server is provided with a user account corresponding to the identification code. User information, user permission and available service information including music data are stored under the user ID. The user information can correspond to server identifications so that the server can login other servers according to the server identifications, obtain music data from other servers, and return the music data to the music player 700.

The music player 700 can obtain the music data from the server automatically. The music player 700 may be long connected to the server so that the server can push the music data to the music player 700. Alternatively, the server may push the music property information for obtaining the music data to the music player 700. The control unit 704 is configured to download the corresponding music data according to the music property information. The music property information includes, but not limited to, at least one of a name of a song, a name of an album, a singer, a librettist, and a composer, etc.

Specifically, the music player 700 decodes the music data to obtain a digital signal, and converts the digital signal to an analog signal via a digital-to-analog conversion.

The audible unit 706 is configured to output the music signal.

The audible unit 706 is configured to output the music signal, specifically, the audible unit 706 converts the music signal into sound waves.

According to the above music player, the identification code is stored in the memory card. When the memory card is inserted in the memory card slot of the music player, the music player can read the identification code from the memory card. The music player sends the identification code to the server, and the server returns the stored music data, corresponding to the identification code, to the music player. Then, the music player converts the music data into the music signal and outputs the music signal. In this manner, the user only needs to carry the memory card, and insert the memory card into the music player to obtain the music data stored corresponding to the identification code, improving a convenience for the user to obtain the music data so that the user can enjoy the pleasure of music anytime and anywhere.

In an embodiment, the control unit 704 may receive equalizer regulating instruction, and adjust sound intensity of the music signal in various frequency ranges according to the equalizer regulating instruction. The control unit 704 is further configured to receive equalizer regulating instruction, generate equalizer configuration information according to the equalizer regulating instruction, and upload the equalizer configuration information to the server for storing. The control unit 704 is further configured to receive the equalizer regulating instruction, generate the equalizer configuration information according to the equalizer regulating instruction, and store the equalizer configuration information in the memory card.

In an embodiment, the control unit 704 is further configured to calculate the music data corresponding to the identification code at local or on the server, analyze a statistical result for the user preference information to obtain equalizer configuration information adapting the user preference information. The equalizer configuration information, mentioned in above embodiments, is used to adjust a sound intensity of the music signal in various frequency ranges.

In an embodiment, the control unit 704 is further configured to read the equalizer configuration information stored in the memory card via the memory card slot 702, and adjust the sound intensity of the music signal in various frequency ranges according to the equalizer configuration information.

In an embodiment, the control unit 704 is further configured to regularly read the identification code from the memory card, and starts resetting and timing after receiving the identification code. If the timing exceeds a preset duration, the mobile terminal 104 will stop accessing the server. In the illustrated embodiment, the timing may be at set intervals or at preset time. The preset duration may be 30 seconds to 1 minute.

Figure 8:
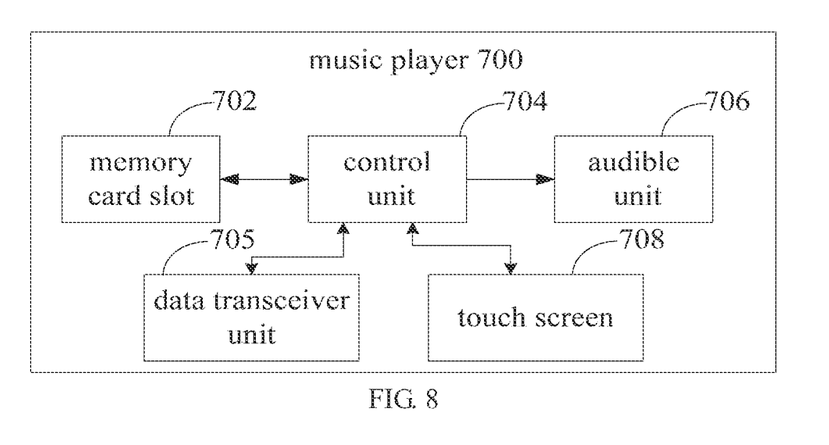
FIG. 8 is a block diagram of a music player in accordance with another embodiment.

Referring to FIG. 8, in an embodiment, the music player 700 further includes a touch screen 708 connected to the control unit 704. The touch screen 708 is configured to receive a touch operation instruction. The control unit 704 is configured to operate according to the touch operation instruction and obtain an operation result. The touch screen is further configured to display the operation result.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A method for obtaining music data, comprising:
   reading an identification code from a removable memory card inserted in a memory card slot provided on an earphone body or an earphone wire control device, wherein the identification code is uniquely associated with the memory card;

sending the identification code to a mobile terminal so that the mobile terminal sends the identification code to a first server, and the first server retrieves stored music data corresponding to the identification code from a plurality of music servers and automatically returns the stored music data in an audio format, corresponding to the identification code, to the mobile terminal;

receiving a music signal converted by the mobile terminal after the mobile terminal obtains the music data from the server, wherein the music signal corresponds to the identification code;

reading equalizer configuration information stored on the memory card and transmitting it to the mobile terminal, enabling the mobile terminal to adjust sound intensity of the music signal in various frequency ranges based on the equalizer configuration information; and outputting the music signal, wherein sending the identification code and the equalizer configuration information to the mobile terminal comprises sending a pre-defined acceptance notice in the form of an audio signal prior to sending the identification code and the equalizer configuration information to the mobile terminal so that the mobile terminal starts receiving the subsequent transmitted identification code and equalizer configuration information after detecting the acceptance notice.

2. The method according to claim 1, further comprising:
establishing a connection between the earphone and the mobile terminal by connecting an earphone plug to an earphone jack of the mobile terminal, wherein sending the identification code and the equalizer configuration information to the mobile terminal comprises:
generating a microphone electrical signal according to the identification code and the equalizer configuration information; and
transmitting the microphone electrical signal to the mobile terminal via a microphone circuit of the earphone cable so that the mobile terminal sends the identification code and the equalizer configuration information, obtained according to the microphone electrical signal, to the server, and the server returns the music data, stored corresponding to the identification code, to the mobile terminal.

3. The method according to claim 1, further comprising receiving a touch operation instruction of a touch screen, operating according to the touch operation instruction, and displaying an operation result.

4. An earphone, comprising:
a memory card slot;
a control unit;
a connecting unit; and
an audible unit;
wherein the memory card slot and the connecting unit are respectively connected to the control unit, and the connecting unit is connected to the audible unit;
the memory card slot is configured to be inserted by a removable memory card;
the connecting unit is configured to be connected to a mobile terminal;
the control unit is configured to read an identification code, which is uniquely associated with the memory card, from the memory card via the memory card slot and is further configured to send the identification code to the mobile terminal via the connecting unit so that the mobile terminal sends the identification code, obtained according to a microphone electrical signal, to a first server, and the first server retrieves stored music data corresponding to the identification code from a plurality of music servers and automatically returns the stored music data in an audio format, corresponding to the identification code, to the mobile terminal;

the connecting unit is further configured to receive a music signal converted by the mobile terminal after the mobile terminal obtains music data from the server, wherein the music signal corresponds to the identification code;

the audible unit is configured to output the music signal; and the control unit is further configured to read equalizer configuration information stored on the memory card and transmit it to the mobile terminal, enabling the mobile terminal to adjust sound intensity of the music signal in various frequency ranges based on the equalizer configuration information;

wherein sending the identification code and the equalizer configuration information to the mobile terminal comprises sending a pre-defined acceptance notice in the form of an audio signal prior to sending the identification code and the equalizer configuration information to the mobile terminal so that the mobile terminal starts receiving the subsequent transmitted identification code and equalizer configuration information after detecting the acceptance notice.

5. The earphone according to claim 4, further comprises:
an earphone body, the control unit and the audible unit is arranged in the earphone body, and the memory card slot is provided on a housing of the earphone body.

6. The earphone according to claim 4, wherein the connecting unit comprises an earphone cable and an earphone plug connected to each other, the earphone plug is configured to be connected to an earphone jack of the mobile terminal; wherein the control unit is further configured to transmit the microphone electrical signal to the mobile terminal via a microphone circuit of the earphone cable so that the mobile terminal sends the identification code, obtained according to the microphone electrical signal, to the server, and the server returns the music data, corresponding to the identification code, to the mobile terminal.

7. The earphone according to claim 4, further comprising a touch screen connected to the control unit;
wherein the touch screen is configured to receive a touch operation instruction;
wherein the control unit is configured to operate according to the touch operation instruction and obtain an operation result; and
wherein the touch screen is further configured to display the operation result.

8. The earphone according to claim 4, wherein the connecting unit comprises an earphone cable and an earphone plug connected to each other, the earphone cable is provided with a wire control device, and the memory card slot is provided on the wire control device.

9. A method for obtaining music data, comprising:
reading an identification code from a memory card inserted into a memory card slot provided on an earphone body or an earphone wire control device, wherein the identification code is uniquely associated with the memory card and assigned by a server to the memory card when the memory card is first inserted into the memory card slot;
sending the identification code to a mobile terminal so that the mobile terminal sends the identification code to the server, and the server retrieves stored music data corresponding to the identification code from a plurality of music servers and automatically returns the stored music data in an audio format, corresponding to the identification code, to the mobile terminal;

reading equalizer configuration information stored on the memory card and transmitting it to the mobile terminal, enabling the mobile terminal to adjust sound intensity of a music signal in various frequency ranges based on the equalizer configuration information;

receiving the music signal converted by the mobile terminal after the mobile terminal obtains the music data from the server, wherein the music signal corresponds to the identification code; and outputting the music signal;

wherein the memory card can be removed from the memory card slot and inserted into a second memory card slot associated with a second mobile terminal, enabling the second mobile terminal to obtain and convert the music data based on the identification code and the equalizer configuration information stored on the memory card, and wherein sending the identification code and the equalizer configuration information to the mobile terminal comprises sending a pre-defined acceptance notice in the form of an audio signal prior to sending the identification code and the equalizer configuration information to the mobile terminal so that the mobile terminal starts receiving the subsequent transmitted identification code and equalizer configuration information after detecting the acceptance notice.

* * * * *